United States Patent
Didszuhn

(10) Patent No.: US 6,306,046 B1
(45) Date of Patent: Oct. 23, 2001

(54) SLEEVE FOR SEALING A JOINTED CONNECTION

(76) Inventor: Wolfgang Didszuhn, Konradstrasse 15, D-85077 Manching-Pichl (DE)

( * ) Notice: Subject to any disclaimer, the term of this patent is extended or adjusted under 35 U.S.C. 154(b) by 0 days.

(21) Appl. No.: 09/484,407

(22) Filed: Jan. 14, 2000

(30) Foreign Application Priority Data

Jan. 19, 1999 (DE) .............................. 299 00 828

(51) Int. Cl.⁷ .................................................. F16J 15/52
(52) U.S. Cl. .................................... 464/175; 277/636
(58) Field of Search ........................ 285/226; 464/175, 464/173; 277/636

(56) References Cited

U.S. PATENT DOCUMENTS

| | | | |
|---|---|---|---|
| 3,623,340 | * 11/1971 | Maas | 464/175 |
| 3,866,950 | * 2/1975 | Skoch et al. | 285/4 |
| 4,210,002 | * 7/1980 | Dore | 464/175 |
| 4,559,025 | * 12/1985 | Dore | 464/175 |
| 4,702,483 | 10/1987 | Ukai . | |
| 4,730,834 | * 3/1988 | Ukai et al. | 277/636 |
| 4,878,389 | * 11/1989 | Boge | 464/175 |
| 5,027,665 | * 7/1991 | Hayward | 464/175 |
| 5,311,912 | 5/1994 | Hayward . | |
| 5,765,837 | * 6/1998 | Schwarzler | 277/636 |

FOREIGN PATENT DOCUMENTS

| | | |
|---|---|---|
| 23 36 967 | 7/1973 | (DE) . |
| 3324997 C2 | 7/1983 | (DE) . |
| 35 00 429 | 1/1985 | (DE) . |
| 86 32 511 | 12/1986 | (DE) . |
| 3813782 A1 | 4/1988 | (DE) . |
| 196 01 | 1/1996 | (DE) . |
| 360 U1 | 10/1996 | (DE) . |
| 297 13 709 U1 | 8/1997 | (DE) . |
| 0157 559 | 7/1989 | (EP) . |
| 0157 559 B1 | 7/1989 | (EP) . |
| 0 794 347 A1 | 9/1997 | (EP) . |

* cited by examiner

Primary Examiner—Lynne H. Browne
Assistant Examiner—Kenn Thompson
(74) Attorney, Agent, or Firm—Collard & Roe, PC.

(57) ABSTRACT

A sleeve for sealing a jointed connection is designed in the form of an elastically deformable bellows. On the two ends of the bellows, there are axially aligned ring flanges, which fix the sleeve on a cylindrically shaped fastening flange, and on a shaft, using a muzzle hoop. For fixing fastening flanges of different sizes, several ring flanges have stepped diameters and are lined up in a row. A radially inwardly drawn rib is shaped by molding on the inner end of the ring flange. The rib sealingly rests against the face side of the fastening flange. For achieving an adequate sealing effect, the inside diameter of the rib is smaller than or equal to the inside diameter of the next-smaller ring flange.

6 Claims, 1 Drawing Sheet

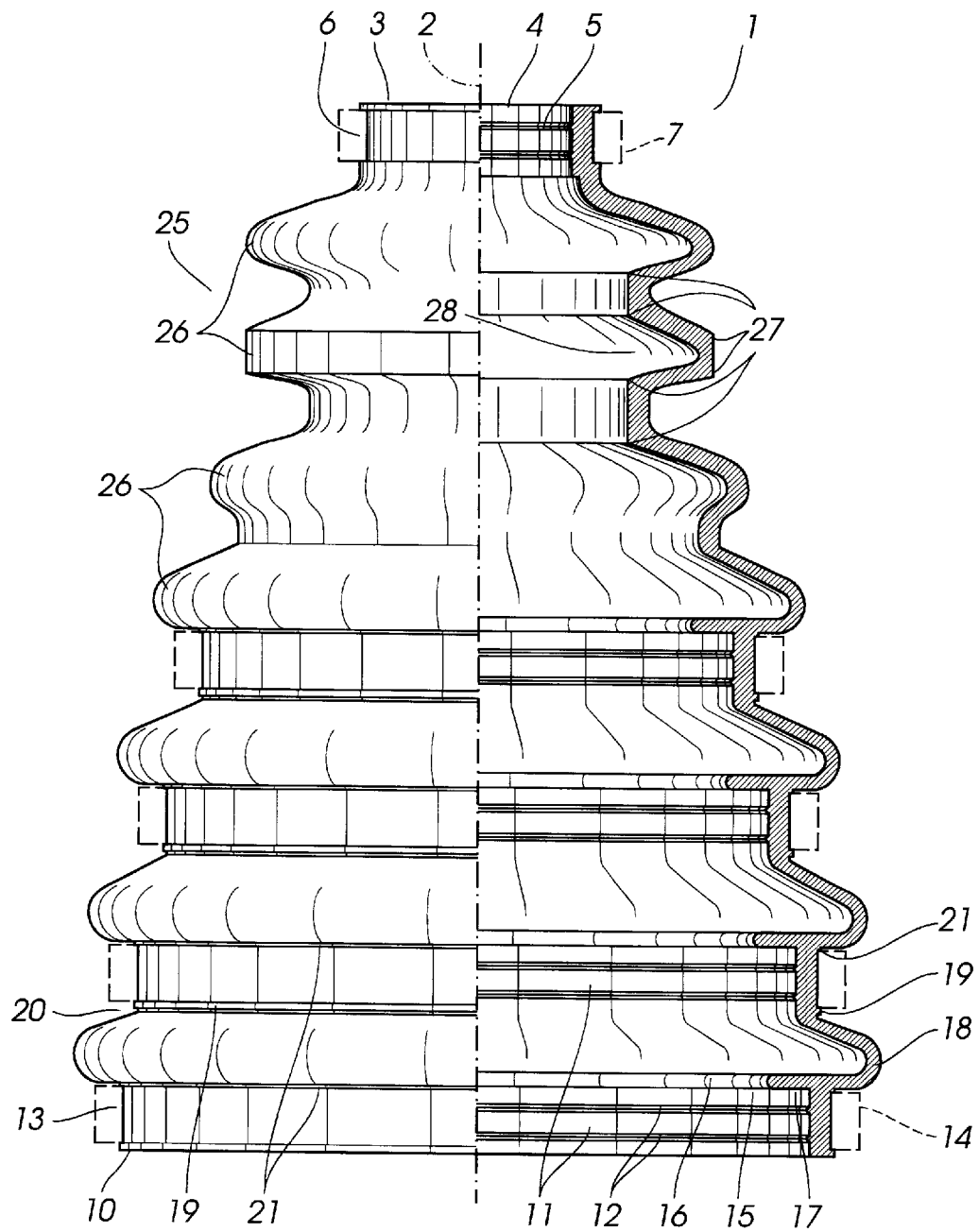

SLEEVE FOR SEALING A JOINTED CONNECTION

BACKGROUND OF THE INVENTION

1. Field of the Invention

The invention relates to a sleeve for sealing a jointed connection.

2. The Prior Art

A protective sleeve for a jointed or hinged connection is discussed in German Patent No. DE 38 13 782 A1. This sleeve has a bellows and ring flanges, which adjoin the bellows and widen outwardly in a step-like way. The stepped annular flanges permit the sleeve to be used on fastening flanges with different diameters. The protruding and excessively large part of the step-like ring flange is cut off from the sleeve. A T-shaped flange is molded on the outer end of each ring flange, and limits a clamping hoop groove on the outer side and abuts the fastening flange on the inner side.

SUMMARY OF THE INVENTION

It is an object of the invention to provide a sleeve of the type described above that has an improved sealing effect.

This and other objects of the invention are accomplished by a sleeve for sealing a jointed connection, comprising an elastically deformable bellows having two ends, and a plurality of axially aligned and differently sized ring flanges lined up between the two ends. The ring flanges fix the sleeve on a cylindrically shaped fastening flange, and on a shaft via a muzzle. The ring flanges are arranged step-wise with increasing diameters from one end of the bellows to the other end to accommodate differently sized fastening flanges. There is a radially inwardly drawn rib having an inside diameter and associated with at least one of the ring flanges. The rib is shaped by molding on an inner end on the ring flange and sealingly abuts a face side of the fastening flange. The inside diameter of the rib is smaller than or equal to an inside diameter of the next-smaller ring flange.

Designing the abutting surface in the form of an inwardly drawn, annular rib on the inner end of the ring flange permits a large surface area of the abutting surface to contact the face side of the fastening flange when the sleeve is fixed on the fastening flange. Since the rib is fixed on the ring flange on the inner side, the rib will not pose an obstacle when the sleeve is attached to the fastening flange, so that the rib can extend inwardly to achieve the desired sealing effect. This means that the abutting surface area will already seal the sleeve correspondingly well, so that grease within the sleeve for lubricating the jointed connection cannot exit. Finally, the abutting surface prevents dirt, which could impair the efficiency of the jointed connection, from penetrating the jointed connection.

Furthermore, the inwardly drawn rib provides stiffness for the cylindrically shaped ring flange, so that the sealing effect of the ring flange in association with the rib versus the fastening flange will be improved as well. Finally, the ribs of the ring flanges not used will provide the sleeve with increased stiffness, so that changes in the diameter of the rotating sleeve will remain small even at higher rates of revolution. This prevents the sleeve from beating or rubbing against stationary parts of the vehicle. In order to obtain adequately high stability of the ring flange, the inside diameter of the rib is smaller than or equal to the inside diameter of the next-smaller ring flange.

In case the ring flanges not used are separated, including the adjoining ribs, before the sleeve is installed, the inside rib diameter can be selected relatively small without taking into account the flange diameter. The inside rib diameter is limited only by the required freedom of movement of a shaft of the jointed connection. If the ring flanges not needed are to be separated only after the sleeve has been mounted, it is preferable if the inside diameter of the rib is dimensioned equal to or only slightly smaller than the inside diameter of the next-smaller ring flange in order to ensure unobstructed mounting of the sleeve on the flange of the jointed connection, and to nonetheless achieve an adequate sealing effect.

Because of the step-like design of the ring flanges, the sleeve has a length that varies with the flange diameter of the jointed connection. However, the deformability requirements of the sleeve increase as the length of the sleeve grows. In order to satisfy this requirement, it is proposed that the sleeve is turned inside out between the annular flanges to create bulgings. Such annular bulgings effect additional elastic deformability, which is more effective the more bulgings are present, and the greater the bulgings are selected. Therefore, the elastic deformability of the sleeve grows with the increase in the ring flange diameter.

So that the ring flanges not used can be easily separated from the sleeve with a knife, it is preferable if the sleeve has small U- or V-shaped grooves on the outer side. The knife can be correctly guided in the grooves, so that a clean cut is obtained without any other auxiliary means. It is necessary to cut off ring flanges only if a ring flange with a small diameter is needed for fixing the sleeve, and if a ring flange with a larger diameter is present on the end of sleeve and is not used and is disturbing.

It is possible to shape the groove by molding it into the sleeve, so that a weakening of the material is obtained within the groove. However, this may have an adverse effect on the useful life of the sleeve, so that it is more favorable if the groove is limited by a lip shaped by molding on the sleeve, as well as by the bulging. This results in adequate marking and safe guidance of the knife without weakening the material of the sleeve. The protruding lip on the end of the ring flange offers safe holding and positioning for the muzzle hoop (or clip) to be fixed.

Preferably, at least one bulging of the bellows is reinforced near the edge. The reinforced bulging will consequently have increased dimensional stability without impairing the swivel motion of the jointed connection. The interior of the reinforced bulging can then be used as a supply space for grease for lubricating the jointed connection.

The dome or prominence of the outer and/or inner fold is preferably flattened. The increased accumulation of material remains in the region of the bend and thus provides the part turned inside out with greater strength and dimensional stability in the right place without losing elasticity, and ease of bending in the ascending and descending wall portions of the bulging.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

The FIGURE shows a side view in partial section of the sleeve according to the invention.

DETAILED DESCRIPTION OF THE PREFERRED EMBODIMENT

Referring now in detail to the drawing, there is shown a sleeve 1. The left half of sleeve 1 is shown by a perspective view, and its right half by a sectional view. The sleeve 1 is a rotation-symmetric body with an axis 2. On an end 3 of sleeve 1, there is a ring flange 4 with two sealing lips 5 extending radially all around on the inner side. Sealing lips 5 tightly fix sleeve 1 on a shaft of the jointed connection. The shaft is not shown. Near end 3, sleeve 1 has a deepening 6 extending radially all around for fixing a muzzle hoop or clip 7 indicated by a dashed line. The force required for pressing the ring flange 4 against the shaft is generated with the muzzle hoop.

Near opposite end 10 of sleeve 1, there are a plurality of ring flanges 11 set one after the other, and tapering with respect to their diameters in a step-like way inwardly. Ring flanges 11 fix sleeve 1 on a fastening flange (not shown), such as a housing or casing. The shaft provided with a jointed connection projects from such a housing (which is also not shown). So as to ensure an adequately tight seal versus the fastening flange, the ring flanges 11 are provided on their inner side with sealing lips 12, which extend radially all around as well. Within the region of each ring flange 11, there is a small deepening 13 extending all around on the outer side of the sleeve 1, which receives a muzzle hoop 14 indicated by a dashed line.

On the inside end 15 of each ring flange 11, a rib 16 is shaped by molding. Rib 16 extends all around and is radially drawn inwardly. With its surface 17 pointing at the ring flange 11, rib 16 forms a stop, which is abutted on the face side by the fastening flange if sleeve 1 is correctly seated. Rib 16, furthermore, provides for stiffening of ring flange 11, so that flange 11 is dimensionally stable in order to be adequately fixable on the fastening flange.

There is a bulging 18 located between two ring flanges 11, which effects a certain deformability with respect to elongation and rotation and thus increased elasticity of sleeve 1. Bulgings 18 ensure that the deformability of sleeve 1 is greater the larger the diameter of the flange of the jointed connection, and thus the greater the spacing between the employed ring flanges 11 and 4.

So that the part of sleeve 1 projecting beyond the ring flange 11 can be easily cut off, bulging 18 and an annular lip 19 shaped by molding on the outer side of sleeve 1 jointly form a V-shaped groove 20. In this way, a knife can be easily guided in the V-shaped groove 20 without the risk of damaging ring flange 11 when the portion of sleeve 1 not required is separated. Within the region of the inside end 15 of each ring flange 11, an additional lip 21 is shaped by molding on the outer side of sleeve 1. Lip 21 and lip 19 jointly form a guide for muzzle hoop 14. Lips 19 and 21 ensure that muzzle hoop 14, which is spaced from bulging 18 of sleeve 1 at least on one side, is correctly fitted. Damage to bulging 18 caused by muzzle hoop 14 is reliably avoided in this way.

Particularly in the center region, sleeve 1 is designed in the form of a bellows formed by four bulgings 26. At least one bulging 26, with its constrictions in the sites where it is reversed, has a reinforced wall with an edge formation 27, which provides the bellows 25 with a certain dimensional stability. In this way, bulging 26 is prevented from being completely compressed when bellows 25 is deformed. Thus the interior 28 of the bulgings 26 can be used as supply space for lubricating grease, and remains sealed by the lips 16.

Accordingly, while only one embodiment of the present invention has been shown and described, it is obvious that many changes and modifications may be made thereunto without departing from the spirit and scope of the invention.

What is claimed is:

1. A sleeve for sealing a jointed connection, comprising:
   an elastically deformable bellows having two ends;
   a plurality of axially aligned and differently sized ring flanges lined up between said two ends, said ring flanges fixing the sleeve on a cylindrically shaped fastening flange and on a shaft via a muzzle, said ring flanges each having an inside diameter, an inner end and an outer end and being arranged step-wise with increasing diameters from one end of the bellows to the other end to accommodate differently sized fastening flanges, with an inner end of one ring flange adjacent an outer end of the next smaller ring flange;
   at least one radially inwardly drawn rib having an inside diameter and connected to the inner end of at least one of said ring flanges, said rib being shaped by molding on the inner end of the ring flange and sealingly abutting a face side of the fastening flange, wherein the inside diameter of the rib is smaller than or equal to the inside diameter of the next-smaller ring flange.

2. The sleeve according to claim 1, further comprising at least one elastically deformable bulging extending all around between each of the ring flanges.

3. The sleeve according to claim 1, further comprising a groove between two adjacent ring flanges, said groove extending all around an outer side of the outer end of the smaller of the two adjacent ring flanges.

4. The sleeve according to claim 3, wherein the groove is shaped by the bulging between the two ring flanges and a lip shaped on the outer side on the outer end of the smaller ring flange.

5. The sleeve according to claim 1, wherein the bulgings have outer and inner folds, at least one of said folds having a reinforced cross section.

6. The sleeve according to claim 5, wherein the sleeve has a longitudinal axis and wherein the reinforced fold has a flattened wall in an area extending lengthwise with respect to the longitudinal axis.

* * * * *